Figure 1:
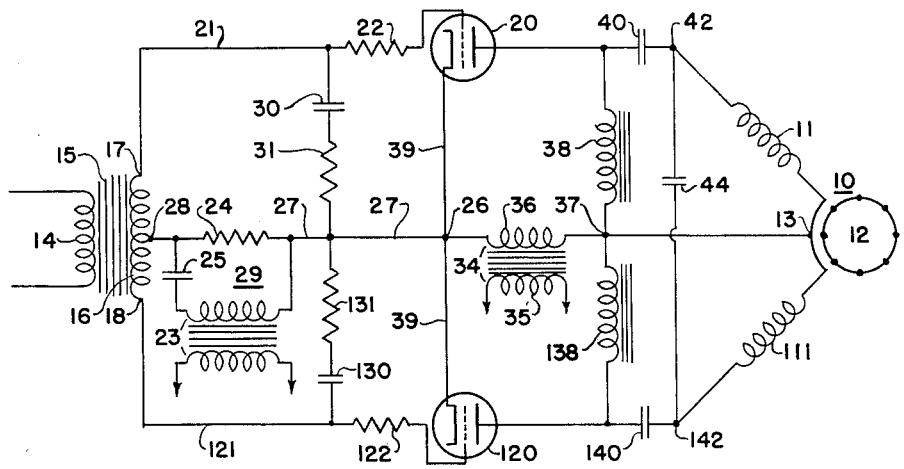

Feb. 3, 1953          O. E. SAWYER ET AL          2,627,594
               ELECTRONIC MOTOR CONTROL CIRCUIT
Filed Feb. 7, 1946                               2 SHEETS—SHEET 1

Inventor
OGDEN E. SAWYER
HENRY R. WARREN

By

Attorney

Patented Feb. 3, 1953

2,627,594

UNITED STATES PATENT OFFICE 2,627,594

ELECTRONIC MOTOR CONTROL CIRCUIT

Ogden E. Sawyer, Cranston, R. I., and Henry R. Warren, Louisville, Ky., assignors to the United States of America as represented by the Secretary of the Navy Application February 7, 1946, Serial No. 646,164

1 Claim. (Cl. 318—202)

The present invention relates to electronic motor control systems and more particularly to an alternating current control circuit employing thermionic tubes for controlling the operation of a split field motor.

It is often desirable to control with precision from a remote station the speed and direction of rotation of a motor and to effect the motor control by the application of a relatively small amount of signal or control energy. The present invention is well suited for this purpose, and is particularly adapted for use in "servo" systems employed, for example, to control the movement of repeaters and similar equipment in gyro-compass systems, of transducers in underwater sound systems, of armament in fire control systems and of antenna in radar systems. The control signal employed in the present invention may be variable in magnitude and is derived from a phase shifting means such as an induction or electrostatic device, a phase shifting network or an electronic means, which serves to translate the movement of the controlling instrumentality into a potential having a variable phase relation with respect to the energizing source.

An object of this invention is to provide an improved electronic control system by which the direction and speed of a split field motor can be controlled with precision in accordance with the phasing of an applied signal potential.

Another object of the invention is to provide an improved electronic control circuit for a split field motor whereby the phase relationship of the energizing potential serves to control the braking torque developed by the motor.

Another object of the invention is to provide an improved electronic control circuit by which a motor is energized with the A. C. component of the rectified alternating current provided by the control circuit.

The invention also resides in certain novel features of circuit arrangement which facilitates the carrying out of the foregoing objects and which contribute both to the simplicity of the electronic control circuit and to the reliability of its operation to control the direction and speed of a split field motor upon the occurrence of a properly phased signal potential and to enable the motor to develop a high braking torque which brings the rotor to a quick stop upon the cessation of the signal or control potential.

Figure 3:
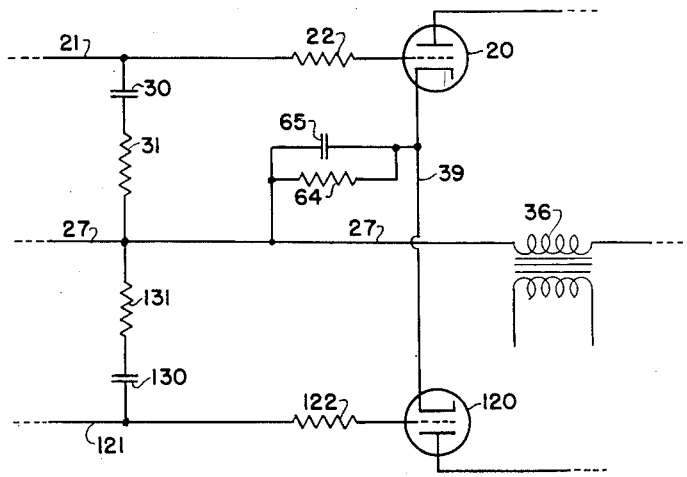
Figure 2:
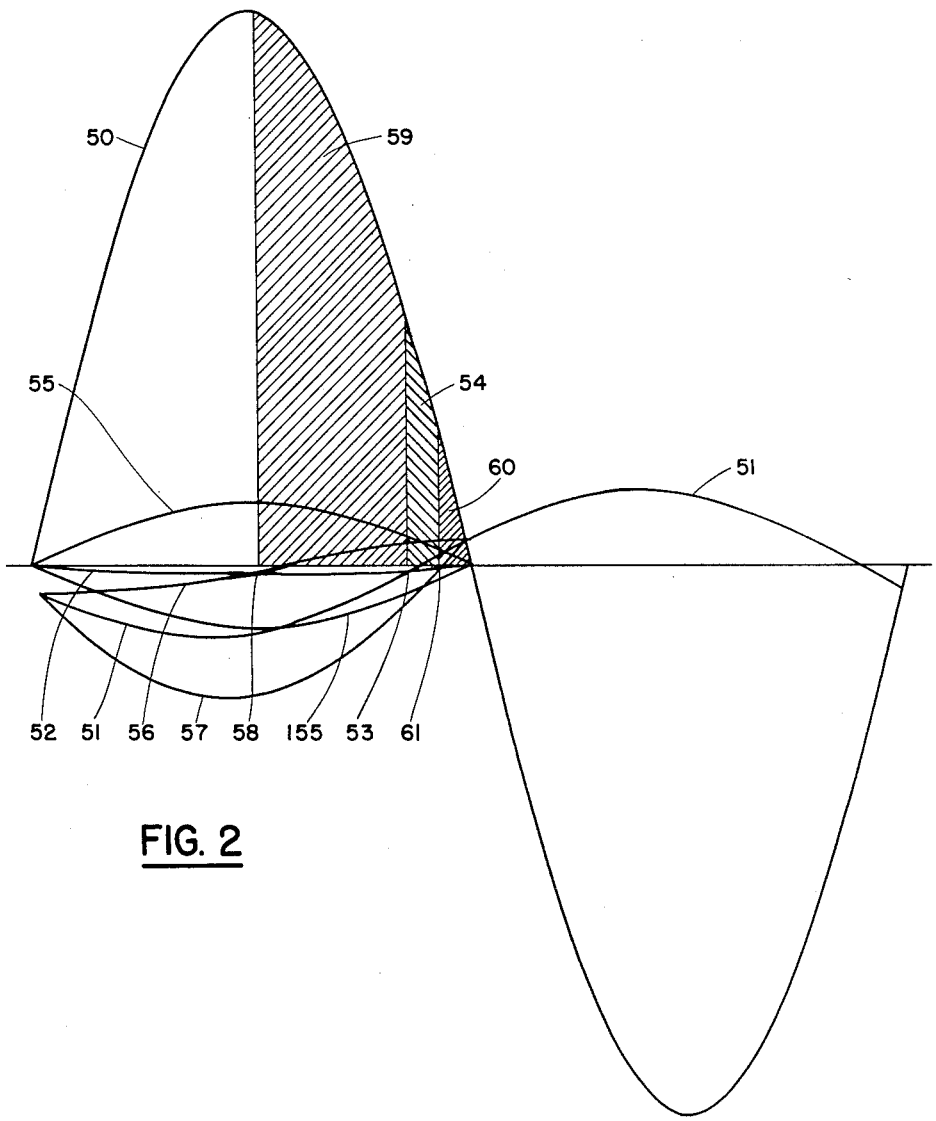

Other objects and advantages of the invention will become apparent from the following detailed description taken in connection with the accompanying drawing, in which:

Figure 1 is a circuit diagram showing a preferred arrangement of the invention,

Figure 2 comprises a group of curves which illustrate the phase relationship of the cathode and anode voltages under non-operating and operating conditions of the circuit disclosed in Figure 1 and Figure 3 is a circuit diagram showing an alternative arrangement of a part of the circuit disclosed in Figure 1.

While the invention is susceptible of various modifications and alternative arrangements, we have shown in the drawings and will herein describe in detail the preferred embodiments. It is to be understood, however, that we do not intend to limit the invention by such disclosure for we aim to cover all modifications and alternative arrangements falling within the spirit and scope of the inventions as defined in the appended claim.

Referring to Figure 1, reference numeral 10 represents a split field motor, the direction of rotation and speed of which is controlled by the characteristics of the signal potential impressed upon the control circuit as will be hereinafter described. For purposes of this description motor 10 will be considered as being of the two-phase alternating current induction type employing a squirrel cage type rotor although it will be apparent that other types of split field motors may be used without departing from the spirit of the invention. Motor 10 is provided with two stator windings 11 and 111 which are connected together at a common terminal 13 and are spaced 90 degrees electrically from each other. The voltages impressed upon each of the stator windings must be approximately 90 degrees out of phase, which phase difference combined with the effect of the 90 degrees mechanical spacing of the windings results in a rotating magnetic field which induces a voltage in the rotor by transformer action. A rotating torque is produced by the interaction of the magnetic fields thus established.

The stator winding 11 and 111 are energized by the control circuit in a manner to result in the desired direction of rotation and speed of the rotor 12 in accordance with the phase of a signal or control potential impressed upon the primary winding 14 of input transformer 15. Each end terminal 17 and 18 of secondary winding 16 of input transformer 15 is connected to the grid of a thermionic device as is shown in Figure 1. End terminal 17 is connected to discharge device 20 by conductor 21 and end terminal 18 is connected to the grid of discharge device 120 by conductor 121. The thermionic devices 20 and 120 are preferably of the gaseous discharge type represented by gas triode tubes known as Thyratrons having a cathode, controlled grid and anode. It will be apparent to those skilled in the art that other types of discharge tubes could successfully be employed in the circuit with slight modification of circuit constants.

Grid-current-limiting resistor 22 is connected in series in conductor 21 between the grid of tube 20 and end terminal, 17 and current-limiting resistor 122 is connected in series in conductor 121 between the grid of tube 120 and end terminal 18. A grid-biasing voltage is supplied to the tubes by a transformer 23 through a phase-shift network 29 consisting of a shunt resistor 24 and a capacitor 25 in series with the secondary winding of transformer 23. One side of the shunt resistor 24 is connected to a common cathode terminal 26 by conductor 27 and the other side is connected to the center tap 28 of secondary winding 16 of input transformer 15. Common cathode terminal 26 is connected to the cathode of tube 20 and tube 120 by conductor 39. By-pass circuits are provided to prevent high frequency voltages from reaching the grids of discharge devices 20 and 120 which comprise capacitors 30 and 130 and resistors 31 and 131. Capacitor 30 and resistor 31 are connected in series between conductor 21 and conductor 27 which is connected to the common cathode terminal 26 and capacitor 130 and resistor 131 are connected between conductor 121 and conductor 27.

The plate potential for tubes 20 and 120 is provided through plate supply transformer 34 which has a primary winding 35 and a secondary winding 36. One end terminal of the secondary winding 36 is connected to the common cathode terminal 26 and the other end terminal of secondary winding 36, identified by reference numberal 37, is connected to the respective plates of discharge devices 20 and 120 through choke coil 38 and 138. The plates of the gaseous discharge devices 20 and 120 are also connected to the stator terminals of the two-phase alternating current induction motor 10. The plate of tube 20 is connected to end terminal 42 of stator winding 11 through capacitor 40 and the plate of tube 120 is connected to end terminal 142 of stator winding 111 through capacitor 140. The common terminal 13 to which the opposite ends of the stator windings 11 and 111 are connected, is connected to the terminal 37 of the secondary winding 36 of plate supply transformer 34.

A phase-splitting capacitor 44 is connected, in the manner commonly adapted for producing leading current in one winding of a two-phase induction motor, between the stator winding terminals 42 and 142.

The circuit shown in Figure 1 operates in the following manner when no signal voltage is impressed upon the primary winding of input transformer 15 and when transformers 23 and 34 are energized from a suitable source of power. The anodes of tubes 20 and 120 are made alternately positive and negative with respect to the cathodes by the alternating current potential supplied through plate transformer 34. At the same time the grids of tubes 20 and 120 are made alternately positive and negative by the biasing voltage delivered by transformer 23 through the phase shift network 29. However, the grid biasing voltage is made to lag the plate voltage a susbtantial number of degrees by the phase shift network 29. The specific phase difference is not critical as long as the voltage lag is in the vicinity of 160 degrees.

The relationship of the anode voltage and the grid-biasing voltage existing in one side of the circuit during a cycle of operation is shown by the curves of Figure 2 with reference to the critical grid-bias below which the tube cannot conduct. Curve 50 represents the plate voltage, curve 51 represents the grid-biasing potential and curve 52 represents the negative grid voltage necessary to prevent current flow in the anode circuit during the positive half of the plate-voltage cycle. From curves 51 and 52 it will be noted that the negative grid-biasing voltage drops below the limiting value at the point of intersection 53 of the two curves, thus intitiating the flow of anode current, which continues to the end of the positive half of the anode voltage cycle. This current flow is represented by the shaded area 54 in Figure 2.

Since current can flow in the plate circuit only during the positive half of the plate-voltage cycle, it takes the form of pulsating direct current, or a direct current with a superimposed alternating current. Direct current flowing through the motor windings 11 and 111 serves no useful purpose and acts adversely by reducing speed and torque and by causing heating of the windings. To prevent this flow, the choke coils 38 and 138 and capacitors 40 and 140 are provided in the circuit. The direct current component passes through the choke coils, while the alternating current component passes through the capacitors to the motor windings. As both tubes 20 and 120 become conductive simultaneously, the alternating current components entering the motor windings 11 and 111 are in phase and equal in magnitude and no torque is produced in the rotor 12 due to the bucking action.

When a signal potential is impressed upon the primary 14 of input transformer 15, it will be either in phase or out of phase with the plate voltage. In either case the voltage induced in the secondary winding 16 will be in phase with the plate voltage as regards one of of the discharge devices and out of phase with the other discharge device. These conditions are represented by signal-voltage curves 55 and 155, respectively, in Figure 2.

In order to describe the operation of the circuit, it will be assumed that when a signal potential is applied to the primary winding 14 of input transformer 15, a voltage is produced in the half of the secondary winding 16 connected through current-limiting resistor 22 to the grid of tube 20. This voltage which is represented by curve 55 in Figure 2 combines algebraically with the grid-biasing voltage 51 to produce a resultant voltage 56 which is applied to the grid of tube 20. Simultaneously, the signal voltage 155 combined with the grid-biasing voltage to produce a resultant voltage 57 which is applied to the grid of tube 120.

As the instantaneous value of a signal voltage 55 increases during a half cycle, the time-point of intersection 58 of the resultant voltage curve 56 with the limiting curve 52, and hence the time of initiation of plate-current flow in the tube 20, rapidly becomes earlier than that represented by intersection 53 until the condition shown in Figure 2 is reached, in which the plate-current is flowing during practically half of the entire positive half of the cycle as represented by the shaded area 59. Further increase in the signal voltage 55 would shift the point 58 to a still earlier position until, for a certain value, the plate-current would flow during substantially the entire positive half cycle. Simultaneously, the point 61 becomes later, reducing the time during which the plate-current flows in tube 120 to practically nothing, which condition is represented by the shaded area 60. Thus the flow of bucking current in the windings is reduced to a minimum during the half cycle.

The pulsating plate-current flowing through tube 20 is separated by the choke coil 38 and capacitor 40 into direct and alternating-current component and the alternating-current component is applied to terminals 42 and 13. Thus current will flow directly through the field winding 11, while the phase-splitting capacitor 44 produces a leading current through the field winding 111. The action of the current through the two field windings results in a rotating field which produces a torque in the rotor 12 to cause it to rotate in a selected direction.

If the polarity of the incoming signal is reversed, tube 120 becomes conductive and current will flow directly through the field winding 111 while the phase-splitting capacitor 50 will produce a leading current through the winding 11. Thus the action of the currents in the two fields will cause the rotor 12 to rotate in the opposite direction.

Upon cessation of the incoming signal, both tubes 20 and 120 become simultaneously conductive over a short portion of the cycle as hereinbefore described and since the currents supplied to both field windings of the motor is in phase, a high braking torque is developed due to the bucking effect of the fields which serves to bring the rotor to a quick stop.

The alternative arrangement disclosed in Figure 3 provides an increase of sensitivity of the motor control circuit by terminating the conduction of the late-firing tube more quickly as the signal or control potential increases during a cycle. This action decreases the bucking current still further through the motor windings and thereby serves to increase the torque produced. The circuit shown in Figure 3 is similar to the circuit of Figure 1 except that instead of connecting the cathodes of the tubes 20 and 120 directly to conductor 27 between the secondary windings of transformers 23 and 34, the cathodes are connected by conductor 39 to conductor 27 through a resistor 64 which is shunted by capacitor 65. When neither of the tubes is conductive, conductor 39 is at the same potential as conductor 27 and when no signal potential is being impressed on the primary 14 of input transformer 15 both tubes simultaneously conduct briefly just before the end of the cycle. As has been explained with reference to Figure 1, when a signal potential is impressed on transformer 15, one of the tubes is caused to fire or become inductive ahead of the order. The resistor 64 forms part of the circuit through which the plate-current flows. In consequence, as the incoming signal potential increases in value, the potential of the conductor 39, and with it that of the cathode of the unfired tube, is gradually raised with respect to the potential of conductor 27 to a positive value which soon becomes greater than the positive value of the incoming signal which produces a condition whereby the tube ceases to be conductive. Thus, for a given signal potential, less bucking current is produced in the motor windings, and the torque output of the motor is higher than it would be with the resistor out of the circuit.

The capacitor 65 is provided to by-pass the alternating current component of the pulsating direct current resulting from the half wave rectifying action of the tube. In this manner a greater alternating current voltage is provided across the field windings of the motor. The capacitor 65 also serves to maintain the potential difference or positive bias as the end of the half cycle is approached.

We claim:

In a system for controlling the speed and direction of rotation of a motor, an alternating current motor having two primary windings having a pair of end terminals and a common terminal, a pair of thermionic tubes each having a cathode, an anode, and a control grid, a pair of inductances each having one terminal connected to a respective one of said anodes of said thermionic tubes respectively and one terminal connected to a common power terminal, a first source of alternating current connected to the cathodes of said thermionic tubes and to said common power terminal for energizing said anodes through said inductances, an alternating current signal voltage varying in phase and amplitude with the desired direction and speed of rotation of said motor respectively, center-tapped means for impressing said signal voltage in phase opposition on said grids respectively, a second source of alternating current lagging said first source of alternating current by more than ninety electrical degrees impressed on said grids in phase with each other, capacitive means connecting said end terminals of said motor to said anodes respectively, means connecting said common power terminal to said common terminal of said motor, and a capacitance connected to said end terminals of said motor, whereby the speed and direction of said motor is determined by the phase and amplitude of said alternating current signal voltage.

OGDEN E. SAWYER.
HENRY R. WARREN.

REFERENCES CITED

The following references are of record in the file of this patent:

UNITED STATES PATENTS

| Number | Name | Date |
| --- | --- | --- |
| 1,955,322 | Brown | Apr. 17, 1934 |
| 2,054,945 | Nisbet | Sept. 22, 1936 |
| 2,164,728 | Wey | July 4, 1939 |
| 2,209,369 | Wills | July 30, 1940 |
| 2,389,827 | Stein | Nov. 27, 1945 |
| 2,414,384 | Moseley | Jan. 14, 1947 |
| 2,417,868 | Glass | Mar. 25, 1947 |
| 2,508,639 | Field | May 23, 1950 |